United States Patent
Sei (10) Patent No.: US 10,306,088 B2
(45) Date of Patent: May 28, 2019

(54) IMAGE FORMING APPARATUS WITH A READING CONTROLLER THAT HAS TWO MODES AND ASSOCIATED CONTROL METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Masaaki Sei, Kannami Tagata Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/704,175

(22) Filed: Sep. 14, 2017

(65) Prior Publication Data

US 2019/0082069 A1    Mar. 14, 2019

(51) Int. Cl.
*H04N 1/00*    (2006.01)

(52) U.S. Cl.
CPC ..... *H04N 1/00708* (2013.01); *H04N 1/00005* (2013.01); *H04N 1/00018* (2013.01); *H04N 1/00588* (2013.01)

(58) Field of Classification Search
CPC .................................................. H04N 1/00708
USPC ......................................................... 358/1.13
See application file for complete search history.

(56) References Cited

U.S. PATENT DOCUMENTS

| | | | |
|---|---|---|---|
| 2005/0095045 A1 | 5/2005 | Suzuki | |
| 2010/0148423 A1 | 6/2010 | Morita et al. | |
| 2016/0070219 A1* | 3/2016 | Ono | G03G 15/50 399/86 |
| 2016/0205271 A1* | 7/2016 | Nakayoshi | H04N 1/0057 358/1.12 |
| 2018/0095701 A1* | 4/2018 | Takahashi | G06F 3/1204 |
| 2018/0107146 A1* | 4/2018 | Shinohara | G03G 15/5029 |

\* cited by examiner

*Primary Examiner* — Jacky X Zheng
(74) *Attorney, Agent, or Firm* — Amin, Turocy & Watson LLP (57) ABSTRACT

In accordance with an embodiment, an image forming apparatus comprises an image reading section, a size detection section, and a reading controller. The image reading section reads image information of a reading object. The size detection section detects a size of the reading object. The reading controller has a first mode in which the image reading section reads the image information of the reading object at the size detected by the size detection section and a second mode in which the image reading section reads the image information of the reading object at a maximum size at which the image reading section can read the reading object as operation modes, and generates image information of the size detected by the size detection section based on the image information read by the image reading section if the second mode is selected.

8 Claims, 5 Drawing Sheets

IMAGE FORMING APPARATUS WITH A READING CONTROLLER THAT HAS TWO MODES AND ASSOCIATED CONTROL METHOD

FIELD

Embodiments described herein relate generally to an image forming apparatus and a control method.

BACKGROUND

Conventionally, at the time of reading image information of a reading object, there is known an image forming apparatus which detects a size of the reading object by two methods (first detection and second detection). The first detection is that the image forming apparatus detects the size of the reading object placed on an upper surface of a stacking tray with a first detection section. The stacking tray is a tray on which a user places the reading object at the time the image forming apparatus reads the image information of the reading object. The second detection is that the image forming apparatus detects the size of the reading object with a second detection section at the time of conveying the reading object inside the image forming apparatus.

In such an image forming apparatus, there is a case in which a first detection result which is a detection result of the first detection is not consistent with a second detection result which is a detection result of the second detection. For example, such an inconsistency occurs if the reading object is Z-folded, or if a plurality of the reading objects having different sizes is overlapped. The reason is that the image forming apparatus detects a size smaller than an actual size of the reading object in the first detection as the size of the reading object. If the first detection result is not coincident with the actual size of the reading object, the image forming apparatus cannot read the image information of the reading object correctly in some cases. As a result, the image forming apparatus determines that an error occurs and stops reading the image information of the reading object. For example, in that case, if the second detection section is provided at a position which is a position inside the image forming apparatus and satisfies a certain condition, the image forming apparatus cannot normally read the image information of the reading object. The condition is that the reading of the image information of the reading object by the image forming apparatus is started between the start and the end of the detection of the size of the reading object by the second detection section.

DETAILED DESCRIPTION

In accordance with an embodiment, an image forming apparatus comprises an image reading section, a size detection section, and a reading controller. The image reading section reads image information of a reading object. The size detection section detects a size of the reading object. The reading controller has a first mode in which the image reading section reads the image information of the reading object at the size detected by the size detection section and a second mode in which the image reading section reads the image information of the reading object at a maximum size at which the image reading section can read the reading object as operation modes, and generates image information of the size detected by the size detection section based on the image information read by the image reading section if the second mode is selected.

Hereinafter, an image forming apparatus of an embodiment is described with reference to the accompanying drawings. In each figure, the same reference numerals are donated to the same components. As an example of the image forming apparatus of the embodiment, an image forming apparatus 100 is described as an example below. As an example, a case in which a size of a reading object is represented by the row A prescribed by ISO (International Organization for Standardization) 216 is described. Furthermore, the size may be represented by another standard or represented by a value based on the reading object. The value is, for example, a length in a longitudinal direction of the reading object, a length in a short direction of the reading object, an area of the reading object, or the like.

(Details of the Image Forming Apparatus)

Figure 1:
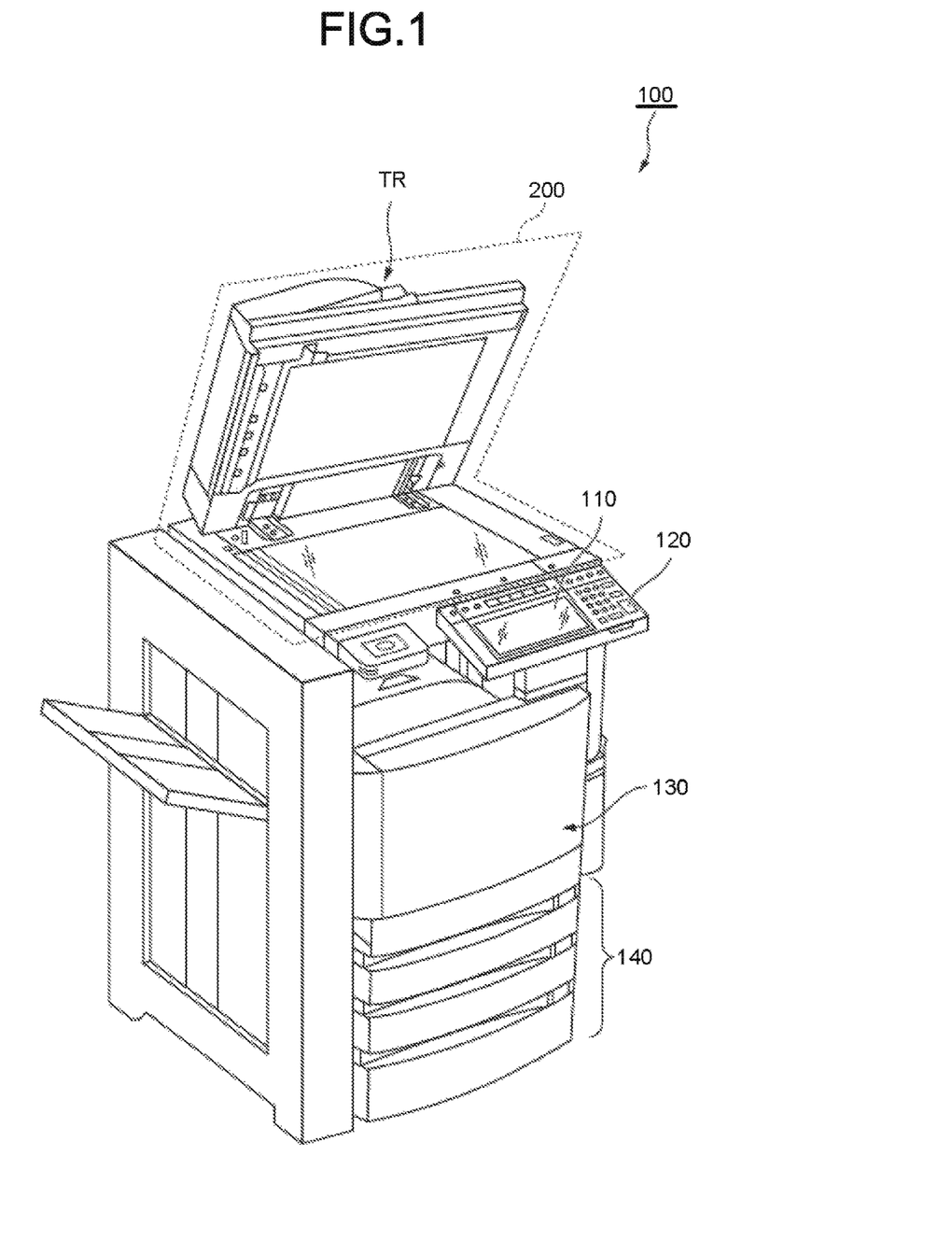
FIG. 1 is an external view exemplifying the overall constitution of an image forming apparatus according to an embodiment.

With reference to FIG. 1, the details of the image forming apparatus 100 are described below.

FIG. 1 is an external view exemplifying the overall constitution of the image forming apparatus 100 according to the embodiment. The image forming apparatus 100 is, for example, a multi-functional peripheral. The image forming apparatus 100 includes a display 110, a control panel 120, a printer section 130, a sheet housing section 140 and an image reading section 200. Furthermore, the printer section 130 of the image forming apparatus 100 may be a device of an electrophotographic system for fixing a toner image, or an inkjet type device.

The image forming apparatus 100 forms an image on a sheet using a developer such as a toner. The sheet is, for example, a paper. The sheet may be an optional object such as a label paper as long as the image forming apparatus 100 can form an image on a surface thereof.

The display 110 is an image information processing device such as a liquid crystal display, an organic EL (Electro Luminescence) display and the like. The display 110 displays various information relating to the image forming apparatus 100.

The control panel 120 receives an operation by a user. At least a part of the control panel 120 is constituted integrally with the display 110 as a touch panel. The control panel 120 may have one or more buttons. The control panel 120 outputs a signal in response to an operation executed by the user to a controller of the image forming apparatus 100. Furthermore, the control panel 120 may be separated from the display 110.

The printer section 130 forms an image on the sheet based on image information generated by the image reading section 200 or image information received through a communication path. The printer section 130 forms an image through the following processing, for example. An image forming section of the printer section 130 forms an electrostatic latent image on a photoconductive drum based on the image information. The image forming section of the printer section 130 forms a visible image by attaching the developer to the electrostatic latent image. Toner is exemplified as a concrete example of the developer. A transfer section of the printer section 130 transfers the visible image onto the sheet. A fixing section of the printer section 130 fixes the visible image on the sheet by heating and pressurizing the sheet. The sheet on which the image is formed may be a sheet housed in the sheet housing section 140, or a sheet that is manually fed.

The sheet housing section 140 houses the sheet used in the image formation by the printer section 130.

The image reading section 200 reads the image information which is a reading object as intensity of light. For example, the image reading section 200 is a RADF (Reversing Automatic Document Feeder). Furthermore, the image reading section 200 may be a DSDF (Dual Scan Document Feeder) or an ADF (Automatic Document Feeder). The image reading section 200 may be another device which reads the image information which is a reading object as intensity of light.

The image reading section 200 records the read image information. The recorded image information may be transmitted to another information processing apparatus via a network. The recorded image information may be used to form an image on the sheet by the printer section 130. The image reading section 200 includes a stacking tray TR and a size detection section S (not shown). The stacking tray TR is a tray on which the user places the reading object at the time of reading the image information of the reading object by the image reading section 200. The size detection section S detects a size of the reading object. The size detection section S includes a first detection section S1, a second detection section S2, and a third detection section S3. The second detection section S2 may be constituted integrally with the third detection section S3.

The first detection section S1 detects the size of the reading object on the upper surface of the stacking tray TR. The first detection section S1 is, for example, one or more contact sensors. The first detection section S1 may be one or more optical sensors or a combination of one or more contact sensors and one or more optical sensors. In addition, the first detection section S1 may be another sensor in place of the contact sensor and the optical sensor. For example, each of the one or more contact sensors, which is the first detection section S1, is provided to line up along a conveyance direction on the upper surface of the stacking tray TR. The conveyance direction is the direction in which the reading object is conveyed on the upper surface. Each of the one or more contact sensors, which is the first detection section S1, may be provided at another position on the upper surface.

The second detection section S2 detects the size of the reading object in the conveyance of the reading object inside the image reading section 200 (i.e., inside the image forming apparatus 100). The second detection section S2 is, for example, one or more contact sensors. The second detection section S2 may be one or more optical sensors or a combination of one or more contact sensors and one or more optical sensors. The second detection section S2 may be another sensor instead of the contact sensor or the optical sensor. The second detection section S2 is provided in at least a part of a conveyance path in which the reading object is conveyed inside the image reading section 200 at the time of reading the reading object by the image reading section 200. The second detection section S2 is arranged at a position in front of a position where the third detection section S3 is arranged in the conveyance path if the second detection section S2 is separated from the third detection section S3 described later. The front side refers to an opposite side of the conveyance direction in the conveyance path. In the following, as an example, a case in which the second detection section S2 is set at a position in front of a standby position described later in the conveyance path is described. The second detection section S2 may be arranged in another part inside the image reading section 200 as long as it can detect the size of the reading object inside the image reading section 200.

The third detection section S3 detects the size of the reading object in the conveyance of the reading object inside the image reading section 200 (i.e., inside the image forming apparatus 100). The third detection section S3 is, for example, one or more contact sensors. The third detection section S3 may be one or more optical sensors or a combination of one or more contact sensors and one or more optical sensors. The third detection section S3 may be another sensor instead of the contact sensor and the optical sensor. The third detection section S3 is provided in at least apart of the conveyance path in which the reading object is conveyed inside the image reading section 200 at the time of reading the reading object by the image reading section 200. The third detection section S3 is arranged at a rear side of the position where the second detection section S2 is arranged in the conveyance path if it is separated from the second detection section S2. The "rear side" is the aforementioned conveyance direction side in the conveyance path. In the following, as an example, a case in which the third detection section S3 is set at a position after the standby position described later in the conveyance path is described. The third detection section S3 may be provided in another part inside the image reading section 200 as long as it can detect the size of the reading object at the inside thereof.

(Functional Components of the Image Forming Apparatus)

Figure 2:
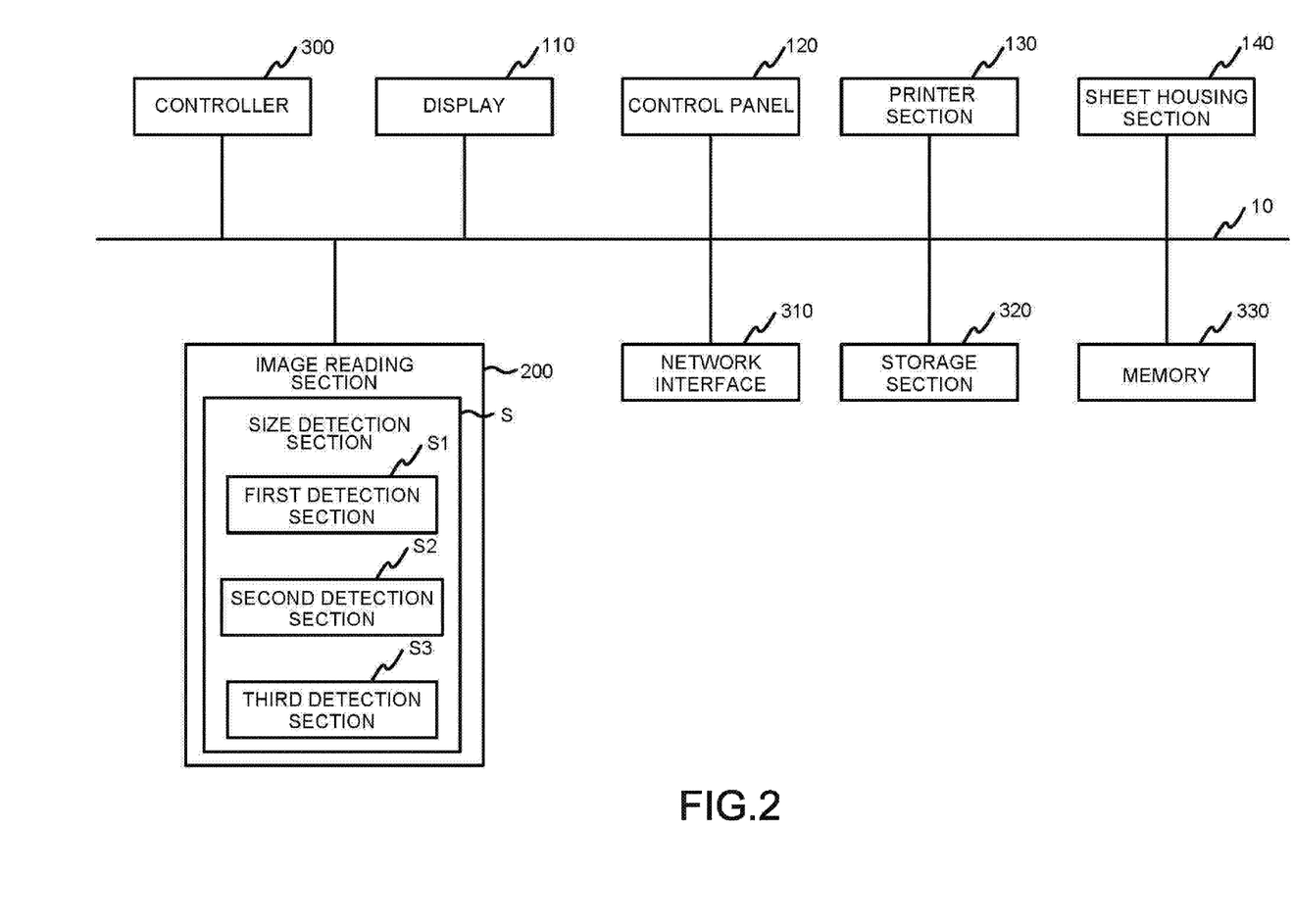
FIG. 2 is a diagram illustrating an example of the functional components of the image forming apparatus.

With reference to FIG. 2, the functional components of the image forming apparatus 100 are described below.

FIG. 2 is a diagram exemplifying the functional components of the image forming apparatus 100 according to the embodiment.

The image forming apparatus 100 includes a controller 300, the display 110, and the control panel 120. The image forming apparatus 100 includes the printer section 130, the sheet housing section 140, and the image reading section 200. The image forming apparatus 100 includes a network interface 310, a storage section 320, and a memory 330. These functional sections of the image forming apparatus 100 are communicably connected via a system bus line 10.

Since the display 110, the control panel 120 and the printer section 130 are the same as those described above, the description thereof is omitted. The sheet housing section 140 and the image reading section 200 are the same as those described above, and thus, the description thereof is omitted as well. The controller 300, the network interface 310, the storage section 320, and the memory 330 are described below.

The controller 300 includes a CPU (Central Processing Unit) of the image forming apparatus 100. The controller 300 controls the operation of each functional section of the image forming apparatus 100. The controller 300 executes a program to execute various processing. The controller 300 acquires an instruction input by the user from the control panel 120. The controller 300 receives an operation from the user through the control panel 120. The controller 300 executes a control processing based on the acquired instruction.

The network interface 310 transmits and receives data to and from other devices. The network interface 310 operates as an input interface to receive the data transmitted from other devices. The network interface 310 operates as an output interface to transmit the data to other devices.

The storage section 320 is an auxiliary storage device such as a hard disk, an SSD (Solid State Drive), etc. The storage section 320 stores various data.

The memory 330 is, for example, a RAM (Random Access Memory). The memory 330 temporarily stores data used by each functional section of the image forming apparatus 100. The memory 330 may store the data generated by the image reading section 200 and a program for operating the functional section.

(Functional Components of the Controller of the Image Forming Apparatus)

Figure 3:
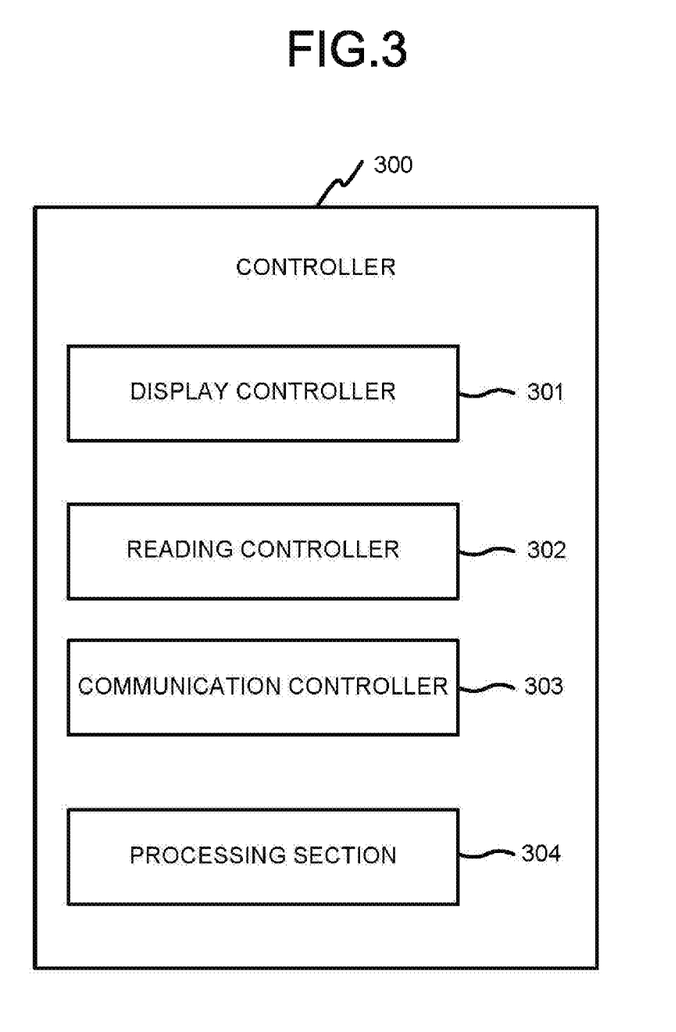
FIG. 3 is a diagram illustrating an example of the functional components of a controller.

With reference to FIG. 3, the functional components of the controller 300 are described below. FIG. 3 is a diagram illustrating an example of the functional components of the controller 300 according to the embodiment.

The controller 300 includes a display controller 301, a reading controller 302, a communication controller 303, and a processing section 304. A part or all of these functional sections may be hardware functional sections such as an LSI (Large Scale Integration) or an ASIC (Application Specific Integrated Circuit).

The display controller 303 generates various images in response to the operation received from the user. The display controller 303 displays the generated image on the display 110.

The reading controller 302 controls the image reading section 200. The reading controller 302 acquires first size information indicating a first size which is the detection result of the first detection section S1 from the first detection section S1. The reading controller 302 acquires second size information indicating a second size which is the detection result of the second detection section S2 from the second detection section S2. Based on the acquired first size information and second size information, the reading controller 302 specifies a size based on the first size information and the second size information as a provisional size of the reading object. The reading controller 302 acquires third size information indicating a third size which is the detection result of the third detection section S3 from the third detection section S3. The reading controller 302 specifies a size based on the acquired third size information as a definite size of the reading object. The reading controller 302 enables the image reading section 200 to read the image information of the reading object. Either of the provisional size and the definite size is an example of the size detected by the size detection section.

The communication controller 303 communicates with other devices via the network interface 310.

The processing section 304 executes a processing according to the operation received by the image forming apparatus 100 from the user.

(Processing Executed by Controller)

Figure 4:
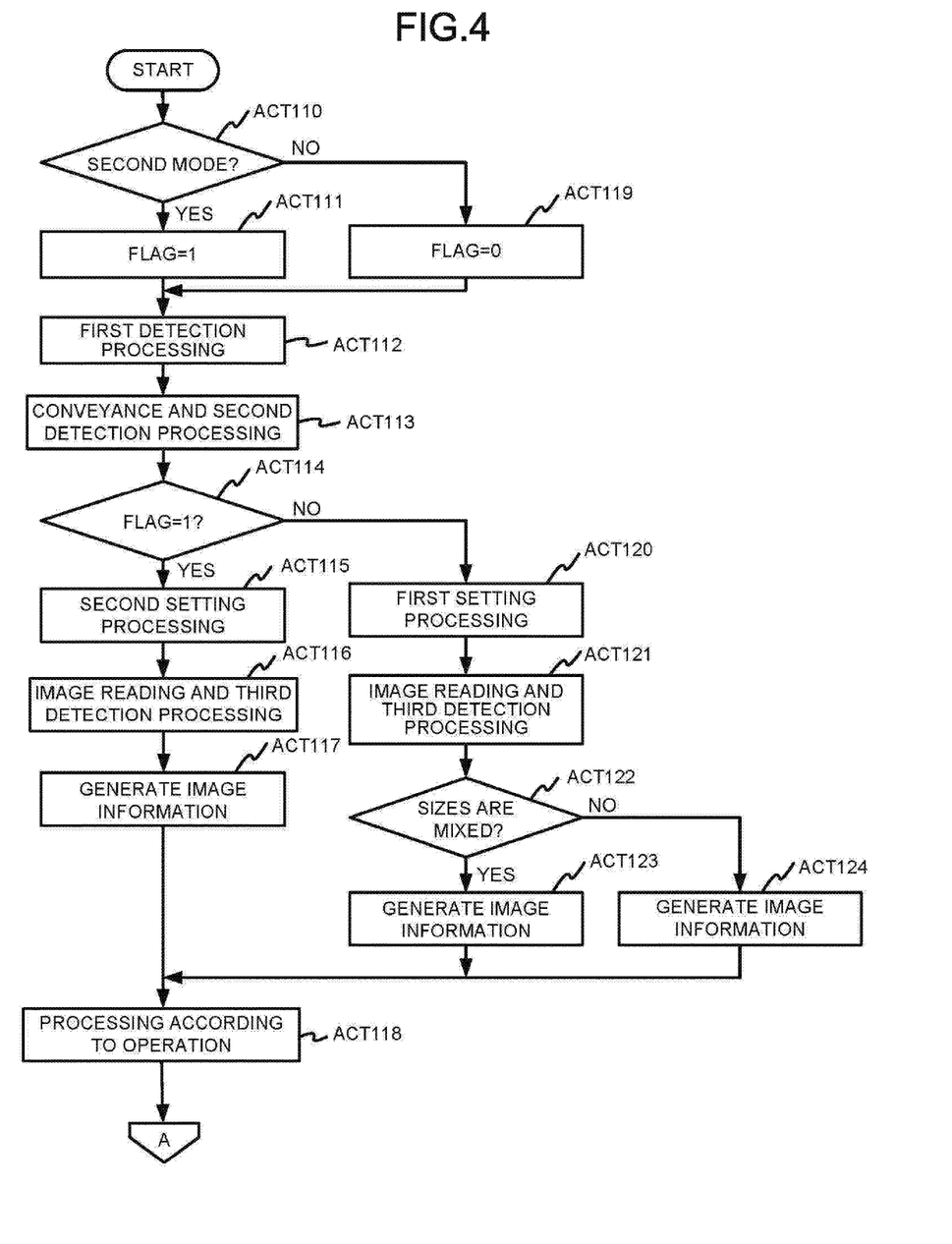
FIG. 4 is a diagram illustrating an example of the flow of a processing executed by the controller.
Figure 5:
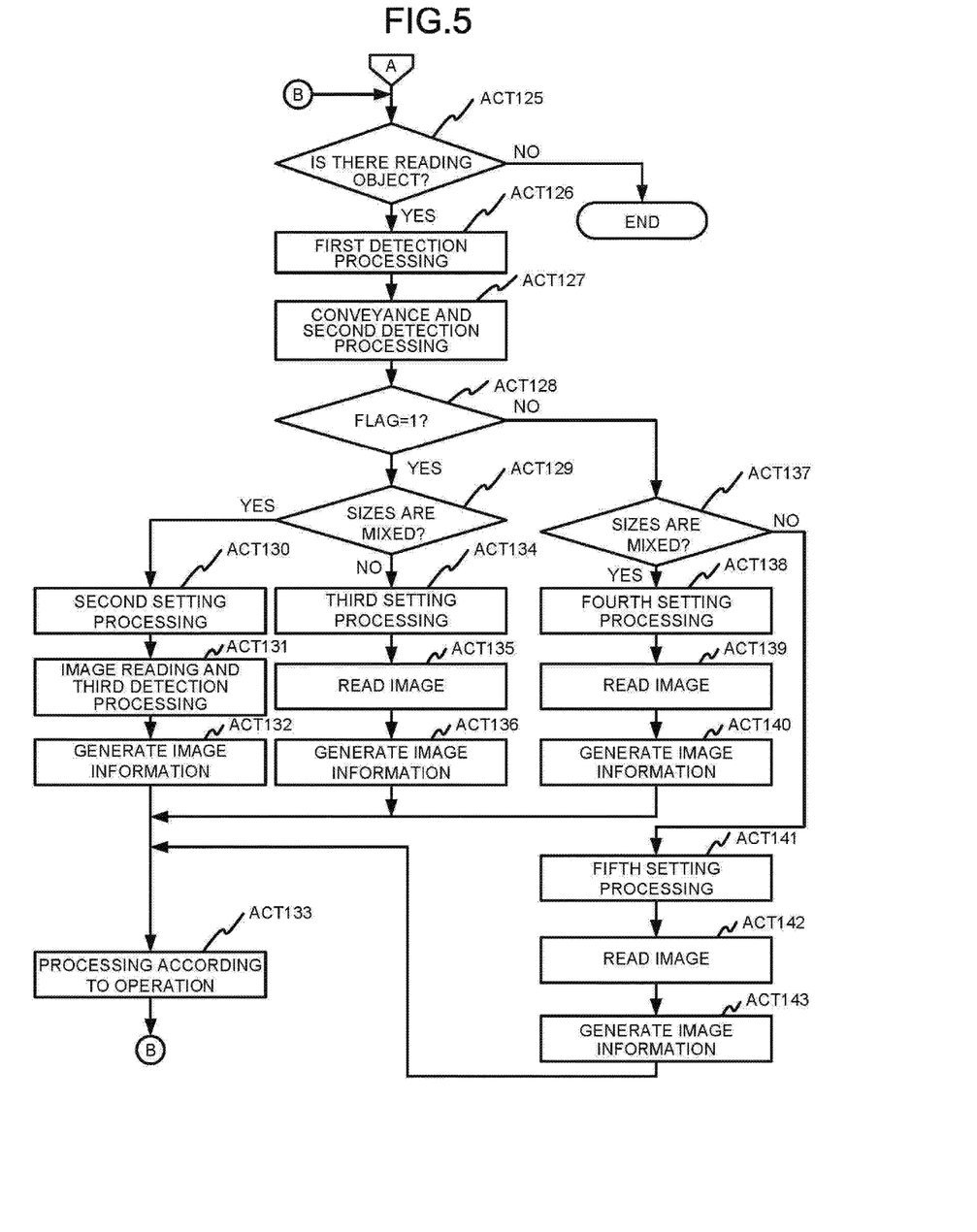
FIG. 5 is a diagram illustrating an example of the flow of the processing executed by the controller.

With reference to FIG. 4 and FIG. 5, the flow of the processing executed by the controller 300 is described below. FIG. 4 and FIG. 5 are diagrams illustrating an example of the flow of the processing executed by the controller 300. Here, the processing in the flowcharts shown in FIG. 4 and FIG. 5 is collectively a processing in one flowchart. The processing in the flowchart is a processing executed by the image forming apparatus 100 after an operation of enabling the image forming apparatus 100 to read the image information of the reading object is received from the user. Below, at a timing before the operation is received by the image forming apparatus 100, a case in which one or more reading objects are placed in an overlapped manner by the user on the upper surface of the stacking tray TR is described.

The reading controller 302 determines whether or not the operation mode of the image reading section 200 is a second mode (ACT 110). In this example, the image reading section 200 has two operation modes, i.e., a first mode and the second mode.

The first mode is an operation mode in which the image information of the reading object is read at the size detected by the size detection section S which detects the size of the reading object between the operation modes of the image reading section 200.

The second mode is an operation mode in which the image reading section 200 reads the image information of the reading object at a maximum size at which the image reading section 200 can read the reading object between the operations modes of the image reading section 200. In the following, as an example, the case in which the maximum size is A3 is described. The maximum size may be larger than A3 or smaller than A3.

For example, the reading controller 302 receives an operation of setting the operation mode of the image reading section 200 to one of the first mode and the second mode via an operation screen. The operation screen is one of the screens that the display controller 301 displays on the control panel 120 (In other words, the display 110) in advance. If the reading controller 302 receives the operation of setting the operation mode of the image reading section 200 to the first mode, the reading controller 302 sets the operation mode of the image reading section 200 to the first mode. If the reading controller 302 receives an operation of setting the operation mode of the image reading section 200 to the second mode, the reading controller 302 sets the operation mode of the image reading section 200 to the second mode.

The reading controller 302 may determine whether or not the operation mode of the image reading section 200 is the first mode in ACT 110. In addition to the first mode and the second mode, the image reading section 200 may have other operation modes. Instead of the first mode, the image reading section 200 may have another operation mode.

If it is determined that the operation mode of the image reading section 200 is the second mode (Yes in ACT 110), the reading controller 302 stores 1 in a variable storing a flag stored in the storage section 320 in advance (ACT 111). Such a case is a case in which the second mode is selected. The reading controller 302 then proceeds to the processing in ACT 112.

On the other hand, if the operation controller 302 determines that the operation mode of the image reading section 200 is not the second mode (No in ACT 110), the reading controller 302 sets 0 to the variable storing the flag stored in advance in the storage section 320 (ACT 119). Such a case is a case in which the first mode is selected. The reading controller 302 then proceeds to the processing in ACT 112.

In ACT 112, the reading controller 302 executes a first detection processing (ACT 112). Here, the processing in ACT 112 is described. The first detection processing is a processing of enabling the first detection section S1 to detect the sizes of one or more reading objects placed on the upper surface of the stacking tray TR as the first size. In other words, the reading controller 302 enables the first detection section S1 to detect the sizes of one or more reading objects placed on the upper surface of the stacking tray TR in an overlapped manner as the first size by the first detection processing. The reading controller 302 then acquires the first size information indicating the first size detected by the first detection section S1 from the first detection section S1.

Next, the reading controller 302 executes conveyance and a second detection processing (ACT 113). Here, the processing in ACT 113 is described.

The reading controller 302 uses the reading object placed at the uppermost position among the one or more reading objects placed on the upper surface of the stacking tray TR in the overlapped manner as a target reading object and enables the image reading section 200 to convey the target reading object to the inside of the image reading section 200. The reading controller 302 enables the image reading section 200 to convey the target reading object to a standby position where the target reading object stands by at the inside of the image reading section 200. The "standby position" is a position provided between an entrance and a reading start position among the positions in the conveyance path described above. The entrance is an entrance to the conveyance path from the upper surface of the stacking tray TR. The reading start position is the position where the reading of the image information of the target reading object is started among the positions in the conveyance path. In this example, the reading start position refers to a position where the target reading object is irradiated with the light so that the image reading section 200 reads the image information of the target reading object as the intensity of the light among the positions in the conveyance path. In this example, the position of the target reading object in the conveyance path is represented by a position at an end of the conveyance direction side in the conveyance path among ends of the target reading object. The position of the target reading object in the conveyance path may be represented by a position of another part of the target reading object in the conveyance path. In this way, the reading controller 302 enables the target reading object to be conveyed to the image reading section 200.

The second detection processing is a processing of enabling the second detection section S2 to detect the size of the target reading object as the second size until the target reading object reaches the standby position. The reading controller 302 enables the second detection section to detect the size of the target reading object as the second size by the second detection processing. Then, the reading controller 302 acquires the second size information indicating the second size detected by the second detection section S2 from the second detection section S2.

After the processing in ACT 113 is executed, the reading controller 302 determines whether or not the value stored in the variable storing the flag stored in the storage section 320 is 1 (ACT 114).

If it is determined that the value stored in the variable storing the flag stored in the storage section 320 is 1 (Yes in ACT 114), the reading controller 302 executes a second setting processing (ACT 115). The second setting processing is a processing of setting the size of the target reading object of which the image information is read by the image reading section 200 to the maximum size described above. The second setting processing is a processing of setting a setting value for reading the image information of the target reading object by the image reading section 200 to a setting value corresponding to the maximum size. The setting value for reading the image information of the target reading object by the image reading section 200 includes at least one of magnification, resolution degree and the like. The reading controller 302 sets the maximum size in the image reading section 200 as the size of the target reading object of which the image information is read the image reading section 200 by the second setting processing. From the plurality of the setting value information, the reading controller 302 reads out setting value information indicating the setting value corresponding to the maximum size from the storage section 320. The plurality of setting value information is stored in advance in the storage section 320 and indicates the setting value corresponding to each size of the reading object. The reading controller 302 sets the setting value indicated by the read setting value information in the image reading section 200 as the setting value for reading the image information of the target reading object by the image reading section 200.

After the processing in ACT 115 is executed, the reading controller 302 enables the image reading section 200 to read the image information of the target reading object and executes a third detection processing (ACT 116). The processing in ACT 116 is described.

The reading controller 302 conveys the target reading object from the standby position to the outside of the image reading section 200 through the reading start position on the conveyance path described above. In this way, while the target reading object passes through the reading start position, the reading controller 302 enables the image reading section 200 to read the image information of the target reading object.

The third detection processing is a processing of enabling the third detection section S3 to detect the size of the target reading object as the third size while the target reading object is conveyed from the standby position to the outside through the reading start position. The outside refers to the outside of the image reading section 200. The reading controller 302 enables the third detection section S3 to detect the size of the target reading object as the third size by the third detection processing. The reading controller 302 then acquires the third size information indicating the third size detected by the third detection section S3 from the third detection section S3.

The reading controller 302 generates the image information (ACT 117). Specifically, the reading controller 302 specifies the size based on the third size information acquired in ACT 116 as the definite size of the target reading object. The size based on the third size information is, for example, the third size indicated by the third size information. The size based on the third size information may be another size based on the third size. The reading controller 302 specifies an area corresponding to the specified definite size among areas on the image based on the image information read ahead by the image reading section 200.

The image information read by the image forming apparatus 100 just before the processing in ACT 117 is executed is the image information read by the image reading section 200 in ACT 116. The size of the image based on the image information is A3 since the target reading object is read at the maximum size described above by the image reading section 200.

A case in which the definite size of the target reading object, which is the size specified by the reading controller 302, is A4 is described as an example. In this case, the reading controller 302 specifies an area corresponding to the area read by the image reading section 200 in a case in which the size of the target reading object is A4 among the areas on the image of A3. The area specified by the reading controller 302 is an area corresponding to the definite size among the areas on the image based on the image information read by the image reading section 200 in ACT 116. The reading controller 302 generates the image information of the image contained in the specified area among the images based on the image information read by the image reading section 200 in ACT 116. At this time, the reading controller 302 generates the image information of a predetermined format. The format is, for example, a PDF (Portable Document Format), a TIFF (Tagged Image File Format), or the like.

After the processing in ACT 117 is executed, the processing section 304 executes a processing which is a processing in response to the operation previously received from the user via the operation screen described above based on the image information generated by the reading controller 302 (ACT 118). The image information is generated through one of the processing in ACT 117, ACT 123 described later and ACT 124 described later. For example, the processing section 304 controls the image forming section to form an image based on the image information generated by the reading controller 302 on the sheet. The processing section 304 may store the image information in the storage section 320 in ACT 118. The processing section 304 may enable the communication controller 303 to transmit the image information to another apparatus in ACT 118. In this case, the communication controller 303 may transmit the image information to another apparatus connected to the image forming apparatus 100 via a LAN (Local Area Network), a WAN (Wide Area Network), the Internet or the like. In this case, the communication controller 303 may transmit the image information to another apparatus by FAX (Facsimile) or the like. The reading controller 302 then proceeds to the processing in ACT 125.

On the other hand, if it is determined that the value stored in the variable storing the flag stored in the storage section 320 is 0 in ACT 114 (No in ACT 114), the reading controller 302 executes the first setting processing (ACT 120). The first setting processing is a processing of setting the size of the target reading object from which the image reading section 200 reads the image information to the provisional size of the target reading object. The first setting processing is a processing of setting the setting value for reading the image information of the target reading object by the image reading section 200 to the setting value according to the provisional size. Based on the first size information and the second size information, the reading controller 302 specifies the size based on the first size information and the second size information as the provisional size. The first size information is acquired by the reading controller 302 in ACT 112. The second size information is acquired by the reading controller 302 in ACT 113. A method by which the reading controller 302 specifies the provisional size may be a known method or a method developed from now on. The reading controller 302 then sets the specified provisional size in the image reading section 200 as the size of the target reading object read by the image reading section 200. The reading controller 302 reads out the setting value information indicating the setting value according to the provisional size from the storage section 320 among the plurality of setting value information stored in the storage section 320. The reading controller 302 sets the setting value indicated by the read setting value information in the image reading section 200 as the setting value for reading the image information of the target reading object by the image reading section 200.

The reading controller 302 enables the image reading section 200 to read the image information of the target reading object and executes the third detection processing (ACT 121). The processing in ACT 121 is the same processing as that in ACT 116, and thus, the description is omitted.

The reading controller 302 determines whether or not information indicating that the sizes are mixed is received in advance (ACT 122). The mixing of the sizes is that the reading objects placed on the stacking tray TR are a plurality of the reading objects with the sizes different from one another. On the operation screen described above, the reading controller 302 receives the information if the selection operation is executed from the user on a size mixing button. The size mixing button is used for the image forming apparatus 100 to receive the information on a GUI (Graphical User Interface) included in the operation screen. The selection operation is, for example, a tap, a click, or the like.

If it is determined that the information indicating the mixing of the sizes is received in advance (Yes in ACT 122), the reading controller 302 generates the image information (ACT 123). Specifically, the reading controller 302 specifies the size based on the third size information acquired in ACT 121 as the definite size of the target reading object. The reading controller 302 specifies an area corresponding to the specified definite size in the areas on the image based on the image information read by the image reading section 200 in ACT 121. Here, if the operation mode of the image reading section 200 is the first mode, the reading object with the maximum size among the reading objects superimposed on the upper surface of the stacking tray TR contacts the upper surface. On the other hand, in the case of mixing the sizes, the reading objects superimposed on the upper surface contains a reading object with the size smaller than the maximum size. In that case, there is a difference between the provisional size mentioned above and the definite size mentioned above. For this reason, the reading controller 302 reads the image information of the target reading object at the above provisional size in ACT 121, and in ACT 123, the area according to the definite size is specified among the areas on the image based on the image information. Thus, the reading controller 302 can generate the image information of the size according to the size of the reading object even in the case of mixing the sizes. In other words, the reading controller 302 can generate the image information of the appropriate size even in this case. The reading controller 302 generates the image information of the image included in the specified area among the images based on the image information read by the image reading section 200 in ACT 121. At this time, the reading controller 302 generates the image information of the predetermined format described above. After the processing in ACT 123 is executed, the processing section 304 proceeds to the processing in ACT 118 described above.

On the other hand, if it is determined that the information indicating mixing of the sizes is not received in advance (No in ACT 122), the reading controller 302 generates the image information (ACT 124). In particular, the reading controller 302 converts the image information read by the image reading section 200 in ACT 121 to the image information of the predetermined format described above. The reading controller 302 generates the image information of the format by this conversion. Here, if the operation mode of the image reading section 200 is the first mode, the reading object at the bottom of the reading objects superimposed on the upper surface of the stacking tray TR contacts the upper surface. Therefore, in this case, and if the sizes are not mixed, there should be no difference between the provisional size mentioned above and the definite size mentioned above. The case in which the sizes are not mixed is a case in which the reading objects superimposed on the upper surface of the stacking tray TR are multiple reading objects with the same size. For this reason, in ACT 124, the reading controller 302 converts the image information read in ACT 121 to the image information of the format. Thus, the reading controller 302 can generate the image information of the appropriate size. After the processing in ACT 124 is executed, the processing section 304 proceeds to the processing in ACT 118 described above.

After the processing in ACT 118 is executed, the reading controller 302 determines whether or not there are one or more reading objects on the upper surface of the stacking tray TR (ACT 125). For example, the reading controller 302 determines that one or more reading objects are not present on the upper surface if the size of the reading object is not detected by the first detection section S1. On the other hand, if the size of the reading object is detected by the first detection section S1, the reading controller 302 determines that there are one or more reading objects on the upper surface.

If it is determined that one or more reading objects are not present on the upper surface of the stacking tray TR (No in ACT 125), the reading controller 302 ends the processing.

On the other hand, if it is determined that there are one or more reading objects on the upper surface of the stacking tray TR (Yes in ACT 125), the reading controller 302 executes the first detection processing described above (ACT 126). Since the processing in ACT 126 is the same processing as the processing in ACT 112, the description thereof is omitted.

The reading controller 302 executes conveyance and the second detection processing (ACT 127). The processing in ACT 127 is the same as the processing in ACT 113, and thus the description thereof is omitted.

It is determined whether or not the value stored in the variable storing the flag stored in the storage section 320 is 1 (ACT 128).

If it is determined that the value stored in the variable storing the flag stored in the storage section 320 is 1 (Yes in ACT 128), the reading controller 302 determines whether or not the information indicating the mixing of the sizes is received in advance (ACT 129).

If it is determined that the information indicating the mixing of the sizes is received in advance (Yes in ACT 129), the reading controller 302 executes the second setting processing as described above (ACT 130). Since the processing in ACT 130 is the same processing as the processing in ACT 115, the description thereof is omitted.

After the processing in ACT 130 is executed, the reading controller 302 enables the image reading section 200 to read the image information of the target reading object and executes the third detection processing (ACT 131). The processing in ACT 131 is the same as that in ACT 116, and thus the description thereof is omitted.

Next, the reading controller 302 generates the image information (ACT 132). The processing in ACT 132 is the same processing as the processing in ACT 117, and thus the description thereof is omitted.

Next, the processing section 304 executes the processing in response to the operation generated in advance from the user via the operation screen and based on the image information generated by the reading controller 302 (ACT 133). The image information is generated in one of the processing in ACT 132, ACT 136 described later, ACT 140 described later, and ACT 143 described later. For example, the processing section 304 controls the image forming section to form an image based on the image information generated by the reading controller 302 on the sheet. The processing section 304 may be store the image information in the storage section 320 in ACT 133. The processing section 304 may enable the communication controller 303 to transmit the image information to another apparatus in ACT 133. In this case, the communication controller 303 may transmit the image information to another apparatus connected to the image forming apparatus 100 via the LAN, the WAN, the Internet, or the like. In this case, the communication controller 303 may transmit the image information to another apparatus by FAX or the like. Then, the reading controller 302 proceeds to the processing in ACT 125.

On the other hand, if it is determined that information indicating the mixing of the sizes is not received in advance (No in ACT 129), the reading controller 302 executes a third setting processing (ACT 134). The third setting processing is a processing of setting the size of the target reading object read by the image reading section 200 to the definite size of the target reading object specified in ACT 117. The definite size is the size of the reading object (in other words, the first reading object) of which the image information is initially read by the image reading section 200 among a plurality of the reading objects superimposed on the upper surface of the stacking tray TR. The third setting processing is a processing of setting the setting value for reading the image information of the target reading object by the image reading section 200 to the setting value corresponding to the definite size. The reading controller 302 sets the definite size specified in ACT 117 by the third setting processing in the image reading section 200 as the size of the target reading object read by the image reading section 200. The reading controller 302 reads out the setting value information indicating the setting value according to the definite size from the plurality of the setting value information stored in the storage section 320 from the storage section 320. The reading controller 302 sets the setting value indicated by the read setting value information in the image reading section 200 as the setting value for reading the image information of the target reading object by the image reading section 200.

The reading controller 302 then enables the image reading section 200 to read the image information of the target reading object (ACT 135).

The reading controller 302 generates the image information (ACT 136). In particular, the reading controller 302 converts the image information read by the image reading section 200 in ACT 135 to the image information of the predetermined format described above. The reading controller 302 generates the image information of the format by this conversion.

Thus, in the processing in ACT 134~ACT 136, the reading controller 302 does not specify the definite size of the target reading object specified in ACT 117. Thus, the reading controller 302 can shorten the time required for the processing of generating the image information of the format which is the image information of the target reading object.

On the other hand, if it is determined that the value stored in the variable storing the flag stored in the storage section 320 is 0 (No in ACT 128), the reading controller 302 determines whether or not the information indicating the mixing of the sizes is received in advance (ACT 137).

If it is determined that the information indicating the mixing of the sizes is received in advance (Yes in ACT 137), the reading controller 302 executes a fourth setting processing (ACT 138). The fourth setting processing is almost the same as the first setting processing. The fourth setting processing is the first setting processing in the case of using the first size information acquired by the reading controller 302 in ACT 126 and the second size information acquired by the reading controller 302 in ACT 127. Thus, the description of the processing in ACT 138 is omitted.

After the processing in ACT 138 is executed, the reading controller 302 enables the image reading section 200 to read the image information of the target reading object (ACT 139).

Next, the reading controller 302 generates the image information (ACT 140). In particular, the reading controller 302 converts the image information read by the image reading section 200 in ACT 139 to the image information of the predetermined format described above. The reading controller 302 generates the image information of the format by this conversion.

Thus, in the processing in ACT 138~ACT 140, the reading controller 302 does not execute the third detection processing and the definite size specification of the target reading object. Thus, the reading controller 302 can shorten the time required for the processing of generating the image information of the format which is the image information of the target reading object. After the processing in ACT 140 is executed, the processing section 304 proceeds to the processing in ACT 133 described above.

On the other hand, if it is determined that the information indicating the mixing of the size is not received in advance (No in ACT 137), the reading controller 302 executes a fifth setting processing (ACT 141). The fifth setting processing is a processing of setting the size of the target reading object read by the image reading section 200 to the provisional size of the target reading object which is the size specified by the reading controller 302 in ACT 120. The reading controller 302 sets the provisional size in the image reading section 200 as the size of the target reading object read by the image reading section 200 in the fifth setting processing. The reading controller 302 reads the setting value information indicating the setting value according to the provisional size among the plurality of setting value information stored in the storage section 320 from the storage section 320. The reading controller 302 sets the setting value indicated by the read setting value information in the image reading section 200 as the setting value for reading the image information of the target reading object by the image reading section 200. If the setting value set in the image reading section 200 is not changed (updated or deleted) in ACT 120 from the execution of the processing in ACT 120 until now, the processing in ACT 141 may be omitted.

The reading controller 302 then enables the image reading section 200 to read the image information of the target reading object (ACT 142).

The reading controller 302 generates the image information (ACT 143). In particular, the reading controller 302 converts the image information read by the image reading section 200 in ACT 142 to the image information of the predetermined format described above. The reading controller 302 generates the image information of the format by this conversion.

In this way, in the processing in ACT 141~ACT 143, the reading controller 302 does not execute the third detection processing executed in ACT 121. Thus, the reading controller 302 can reduce the load on the processing of generating the image information of the format which is the image information of the target reading object.

As described above, the image forming apparatus 100 executes the following processing if the second mode is selected. Based on the image information read by the image reading section (in this example, the image reading section 200), the image forming apparatus 100 generates the image information of the size detected by the size detection section (in this example, the size detection section S). As a result, the image forming apparatus 100 can suppress occurrence of failure in reading the image information of the reading object.

In the image forming apparatus 100, the size detection section detects the provisional size of the reading object and the definite size of the reading object. The image forming apparatus 100 executes the following processing if the second mode is selected. The image forming apparatus 100 generates the image information of the image contained in the area corresponding to the definite size detected by the size detection section among the areas on the image based on the image information read by the image reading section. As a result, the image forming apparatus 100 can suppress the occurrence of failure in reading the image information of the reading object based on the image information of the image included in the area.

In a case in which the second mode is selected, if the information indicating that the plurality of reading objects has the same size is received, the image forming apparatus 100 executes the following processing. The image forming apparatus 100 sets the setting value in the image reading section after having the image reading section reads the first reading object among the plurality of the reading objects. The setting value is the setting value for reading the image information of the reading object which is a setting value of one or higher according to the definite size detected by the size detection section which is the size of the first reading object. The image forming apparatus 100 then enables the image reading section to read the image information of each of the second and subsequent reading objects among the plurality of reading objects. As a result, the image forming apparatus 100 can reduce the time required for the processing of enabling the image reading section to read the image information of each of the second and subsequent reading objects in a case in which the second mode is selected and the sizes are not mixed.

In a case in which the second mode is selected, if the information indicating that the plurality of reading objects has the different sizes is received, the image forming apparatus 100 executes the following processing. The image forming apparatus 100 sets the setting value in the image reading section for each of the second and subsequent reading objects among the plurality of the reading objects and then executes the reading processing after enabling the image reading section to read the first reading object of a plurality of the reading objects. The setting value is a setting value for reading the image information of the reading object which includes one or more setting values in response to the maximum size. The reading processing is the processing of enabling the image reading section to read the image information of the reading object. As a result, the image forming apparatus 100 can suppress the failure from occurring in reading the image information of the reading object in a case in which the second mode is selected and the sizes are mixed.

In addition, if the first mode is selected, the image forming apparatus 100 executes the following processing in a case of receiving information indicating that the plurality of the reading objects has the different sizes. For each of the plurality of the reading objects, the image forming apparatus 100 sets the setting value in the image reading section and then executes the reading processing. The setting value is a setting value for reading the image information of the reading object which includes one or more setting values in response to the provisional size detected by the size detection section which is the size of the reading object. The reading processing is a processing of enabling the image reading section to read the image information of the reading object. In a case in which the first mode is selected, the image forming apparatus 100 executes the following processing in a case of receiving the information indicating that the plurality of the reading objects has the same size. The image forming apparatus 100 sets the setting value in the image reading section after enabling the image reading section to read the first reading object among the plurality of the reading objects. The setting value is a setting value for reading the image information of the reading object which includes one or more setting values in response to the provisional size detected by the size detection section which is the size of the first reading object. The image forming apparatus 100 then enables the image reading section to read the image information of each of the second and subsequent reading objects of the plurality of reading objects. As a result, the image forming apparatus 100 can suppress the occurrence of the failure in reading the image information of the reading object in a case in which the second mode is selected and the sizes are mixed.

Based on the image information generated by the reading controller, the image forming apparatus 100 executes the processing according to the received operation. As a result, the image forming apparatus 100 can suppress the occurrence of the failure in the processing desired by the user.

The image forming apparatus 100 forms the image based on the image information generated by the reading controller (the reading controller 302 in this example) on the sheet by the image forming section as the processing corresponding to the received operation. As a result, the image forming apparatus 100 can suppress the occurrence of the failure in the processing of forming the image on the sheet by the image forming section.

The image forming apparatus 100 transmits the image information generated by the reading controller to another apparatus as a processing corresponding to the received operation. Thus, the image forming apparatus 100 can suppress the occurrence of the failure in the processing of transmitting the image information generated by the reading controller to another apparatus.

If the first mode is selected, the image forming apparatus 100 executes the following processing in a case of receiving the information indicating that the plurality of the reading objects has the same size. The image forming apparatus 100 reads the image information of each of the plurality of the reading objects at the size detected by the first detection section which is the size of the reading object initially read in the image reading section among the plurality of the reading objects. As a result, the image forming apparatus 100 can reduce the time required for the processing of enabling the image reading section to read the image information of each of the second and subsequent reading objects in a case in which the second mode is selected and the sizes are not mixed.

In a case of receiving the operation of selecting either one of the first mode and the second mode as the operation mode of the image reading section, the image forming apparatus 100 executes the following processing. The image forming apparatus 100 stores a flags according to the received operation in the storage section (in this example, the storage section 320). Then, in a case of receiving an operation to start reading the image information of the reading object, the image forming apparatus 100 switches the processing according to the flag stored in the storage section. Thus, the image forming apparatus 100 can suppress the occurrence of the failure in reading the image information of the reading object based on the received operation.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image forming apparatus, comprising:
   an image reading section configured to read image information of a reading object;
   a size detection section configured to detect a size of the reading object; and
   a reading controller configured to have a first mode in which the image reading section reads the image information of the reading object at the size detected by the size detection section and a second mode in which the image reading section reads the image information of the reading object at a maximum size at which the image reading section can read the reading object as operation modes, and generate the image information of the size detected by the size detection section based on the image information read by the image reading section if the second mode is selected, wherein the size detection section detects a provisional size of the reading object and a definite size of the reading object, and if the second mode is selected, the reading controller generates the image information of an image contained in an area corresponding to the definite size detected by the size detection section among areas on the image based on the image information read by the image reading section, and
   wherein there is a plurality of the reading objects, and
   in a case in which the second mode is selected, if information indicating that the plurality of the reading objects has the same size is received, after enabling the image reading section to read first reading object among the plurality of the reading objects, the reading controller sets the setting value for reading image information of the reading object which includes one or more setting values in response to the definite size detected by the size detection section which is a size of the first reading object in the image reading section and enables the image reading section to read the image information of the second and subsequent reading objects among the plurality of the reading objects.

2. The image forming apparatus according to claim 1, wherein
   in a case in which the second mode is selected, if the information indicating that the plurality of reading objects has different sizes is received, the reading controller sets a setting value for reading image information of the reading object which includes one or more setting values corresponding to the maximum size in the image reading section for each of the second and subsequent reading objects among the plurality of the reading objects and then enables the image reading section to read the image information of the reading object after enabling the image reading section to read the first reading object among a plurality of the reading objects.

3. The image forming apparatus according to claim 1, wherein
in a case in which the first mode is selected, if information indicating that the plurality of reading objects has different sizes is received, the reading controller sets a setting value for reading image information of the reading object which includes one or more setting values corresponding to the provisional size detected by the size detection section which is the size of the reading object in the image reading section for each of the plurality of reading objects, and then enables the image reading section to read the image information of the reading object, and
in a case in which the first mode is selected, if information indicating that the plurality of reading objects has the same size is received, the reading controller sets the setting value for reading image information of the reading object which includes one or more setting values corresponding to the provisional size detected by the size detection section which is the size of the first reading object in the image reading section and then enables the image reading section to read the image information of each of the second and subsequent reading objects among the plurality of the reading objects after enabling the image reading section to read the first reading object among the plurality of the reading objects.

4. The image forming apparatus according to claim 1, further comprising:
a processing section configured to execute a processing according to a received operation based on the image information generated by the reading controller.

5. The image forming apparatus according to claim 1, wherein
the processing section enables the image forming section to form an image based on the image information generated by the reading controller on the sheet as the processing.

6. The image forming apparatus according to claim 1, wherein
the processing section transmits the image information generated by the reading controller to another apparatus as the processing.

7. The image forming apparatus according to claim 1, wherein
in a case of receiving an operation of selecting either the first mode or the second mode as the operation mode of the image reading section, the reading controller stores a flag corresponding to the received operation in a storage section, and
in a case of receiving an operation to start reading the image information of the reading object, the reading controller switches a processing according to the flag stored in the storage section.

8. A control method by an image forming apparatus, including:
reading image information of a reading object;
generating the image information of a detected size based on the read image information if a second mode is selected between a first mode in which the image information of the reading object is read at a size detected by a size detection section for detecting the size of the reading object and the second mode in which the image information of the reading object is read at a maximum size at which the reading object can be read;
based on selection of the second mode,
generating the image information of an image contained in an area corresponding to a detected definite size of the reading object among areas on the image based on the image information,
setting the setting value for reading image information of the reading object which includes one or more setting values in response to the detected definite size being a size of a first reading object based on a determination that a plurality of reading objects has a same size, and
enabling reading of the image information of a second and subsequent reading objects among a plurality of the reading objects.

* * * * *